United States Patent [19]
Densow

[11] 3,954,162
[45] May 4, 1976

[54] CENTRIFUGAL CLUTCH WITH LATCH CONTROLLED ENGAGING AND RELEASING WEIGHT

[75] Inventor: Ulrich O. Densow, Peterborough, Canada

[73] Assignee: Outboard Marine Corporation, Waukegan, Ill.

[22] Filed: Feb. 6, 1975

[21] Appl. No.: 547,638

[52] U.S. Cl. ................. 192/105 CE; 192/103 B; 192/17 R; 192/28
[51] Int. Cl.² ........................................ F16D 43/18
[58] Field of Search ............ 192/26, 103 B, 105 CE, 192/105 BA, 105 CD, 114 R, 105 A, 105 BB, 104 B, 17 R

[56] References Cited
UNITED STATES PATENTS

| | | | |
|---|---|---|---|
| 3,199,649 | 10/1965 | Bochan et al. | 192/114 X |
| 3,785,465 | 1/1974 | Johansson | 192/28 X |

FOREIGN PATENTS OR APPLICATIONS 369,544  9/1974  Sweden

Primary Examiner—Benjamin W. Wyche
Attorney, Agent, or Firm—Michael, Best & Friedrich

[57] ABSTRACT

Disclosed herein is a centrifugal clutch comprising a rotatable driver, a clutch drum carried for co-axial rotation relative to the driver, a clutch shoe carried by the driver for common rotation therewith and for movement between a position engaging the clutch drum so as to effect common rotary movement of the driver and the clutch drum and a second position spaced from the clutch drum, a loading shoe, a pivotal connection between the clutch shoe and the loading shoe to afford relative movement therebetween, a trigger movably mounted on one of the loading shoe and the clutch shoe for movement between a first position engaged between the clutch shoe and the loading shoe so as to transmit centrifugal force from the loading shoe to the clutch shoe and a second position of non-engagement between the clutch shoe and the loading shoe, and interengaging surfaces on the loading shoe and on the driver operable when the trigger is in the second position for pivoting the loading shoe in response to radially outward movement thereof so as to positively displace the clutch shoe from the position engaging the clutch drum.

32 Claims, 18 Drawing Figures

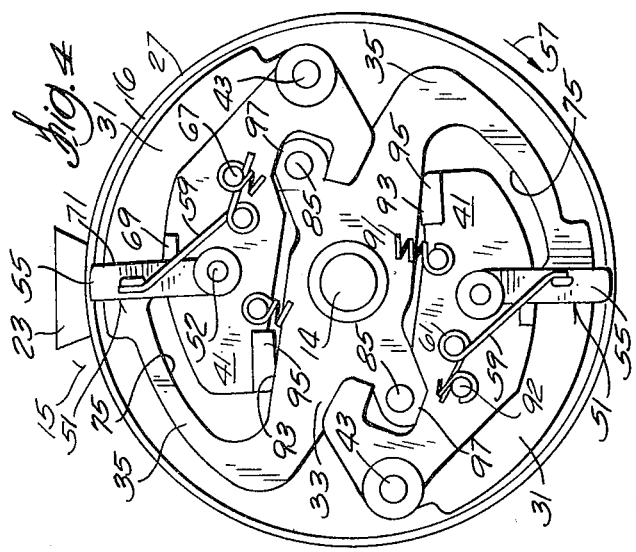
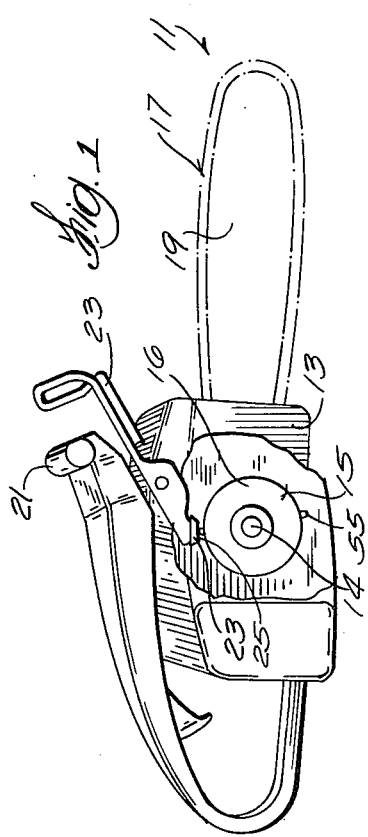
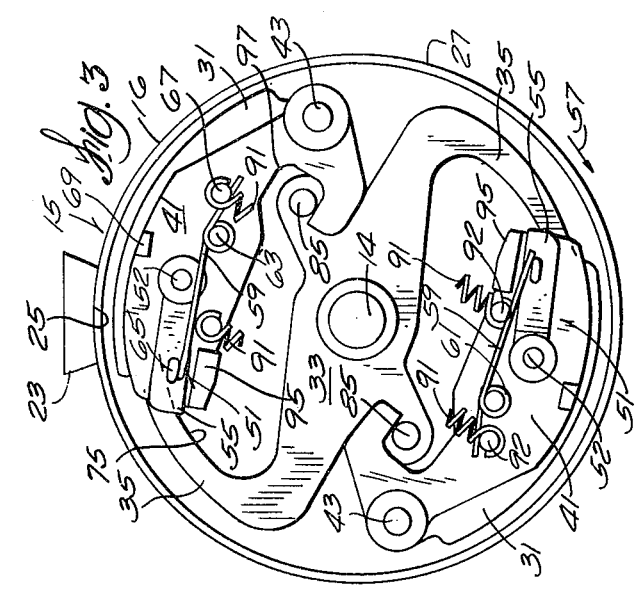
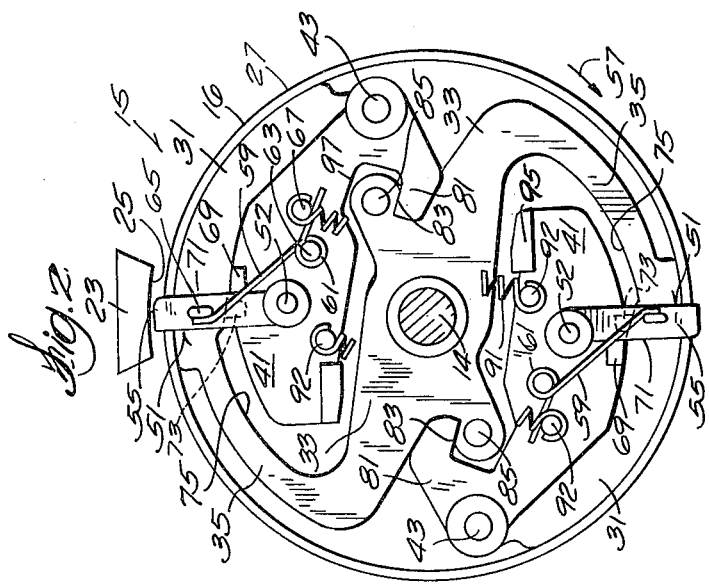

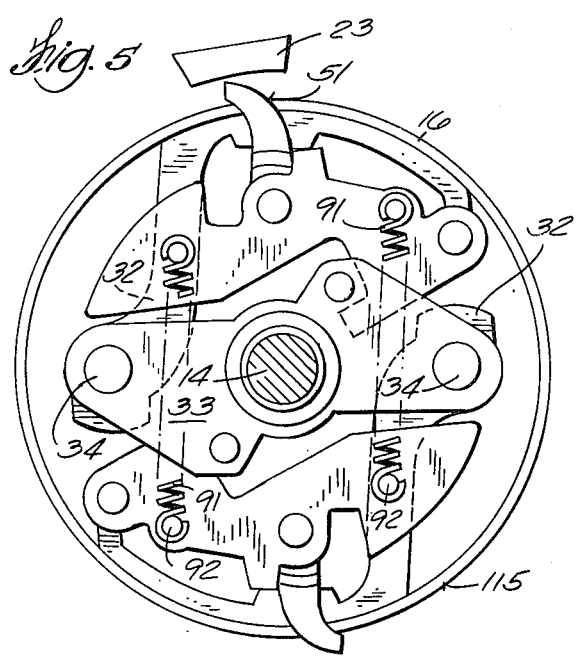
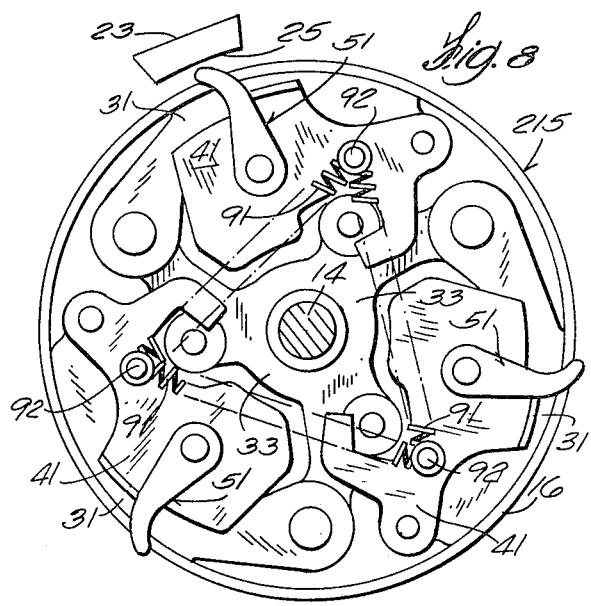
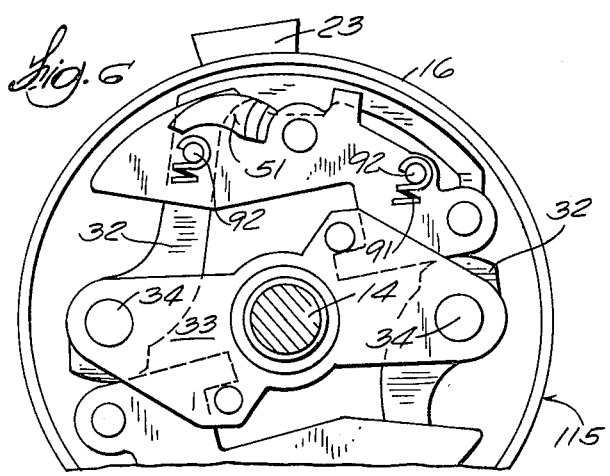
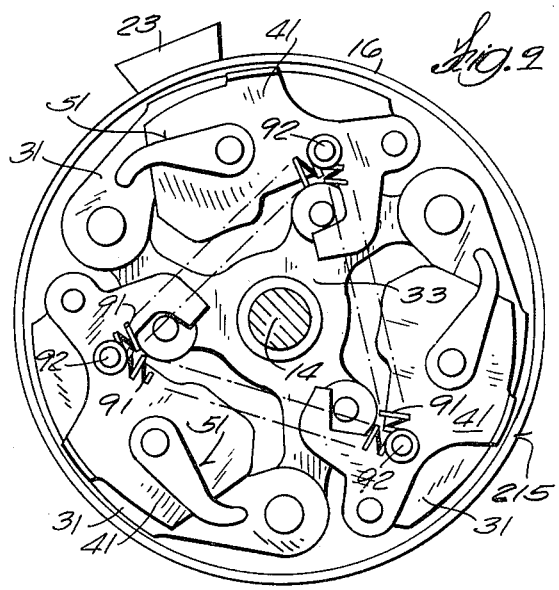
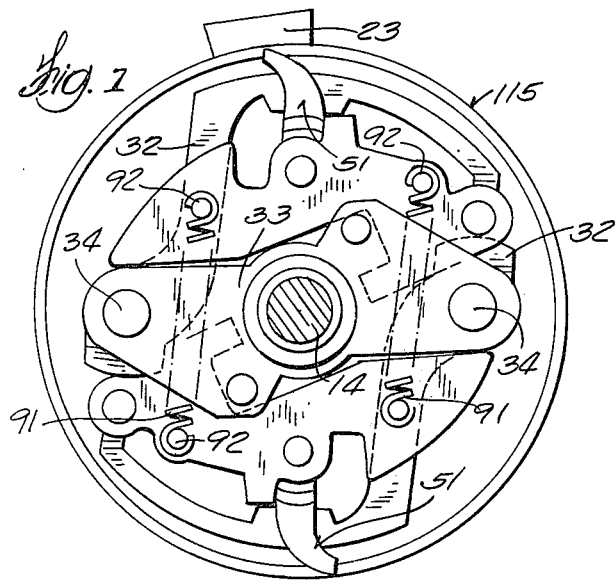
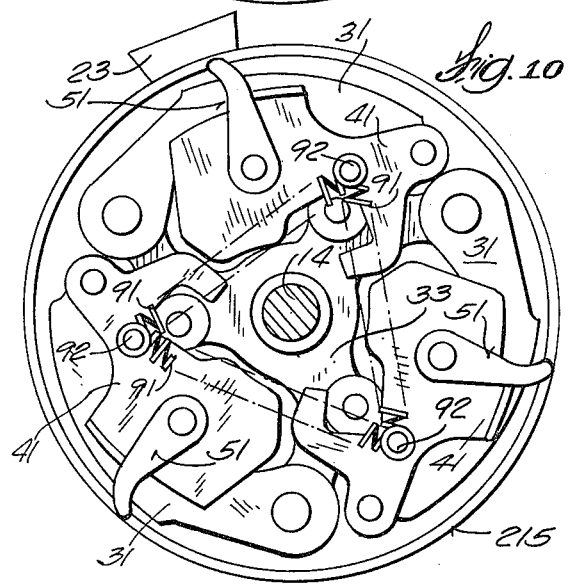

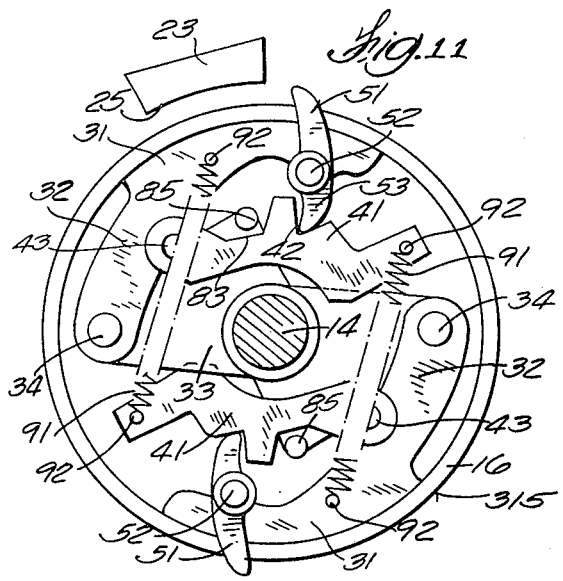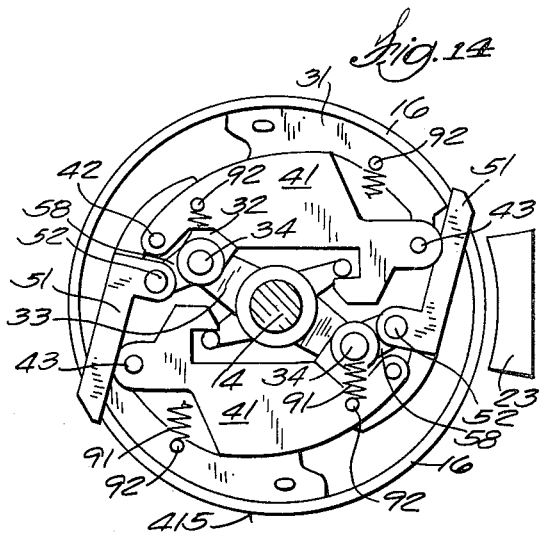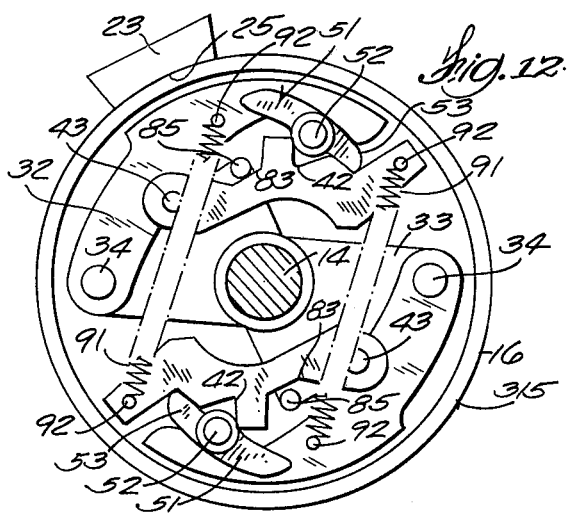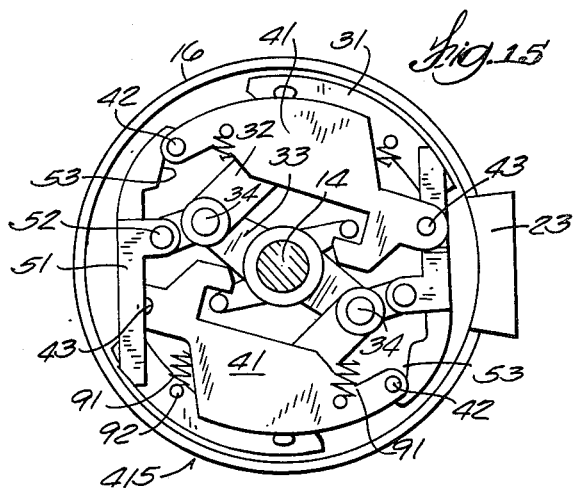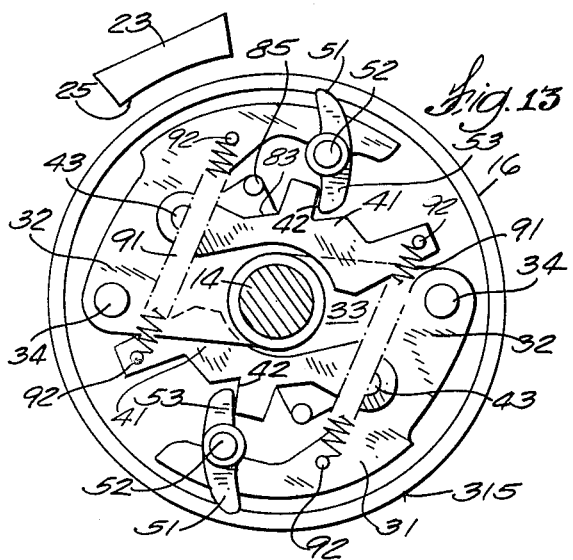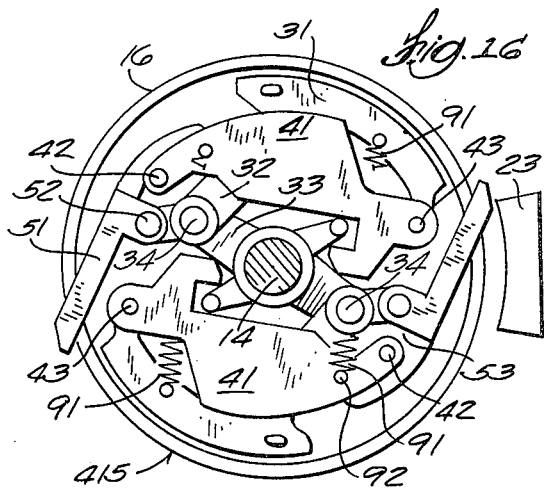

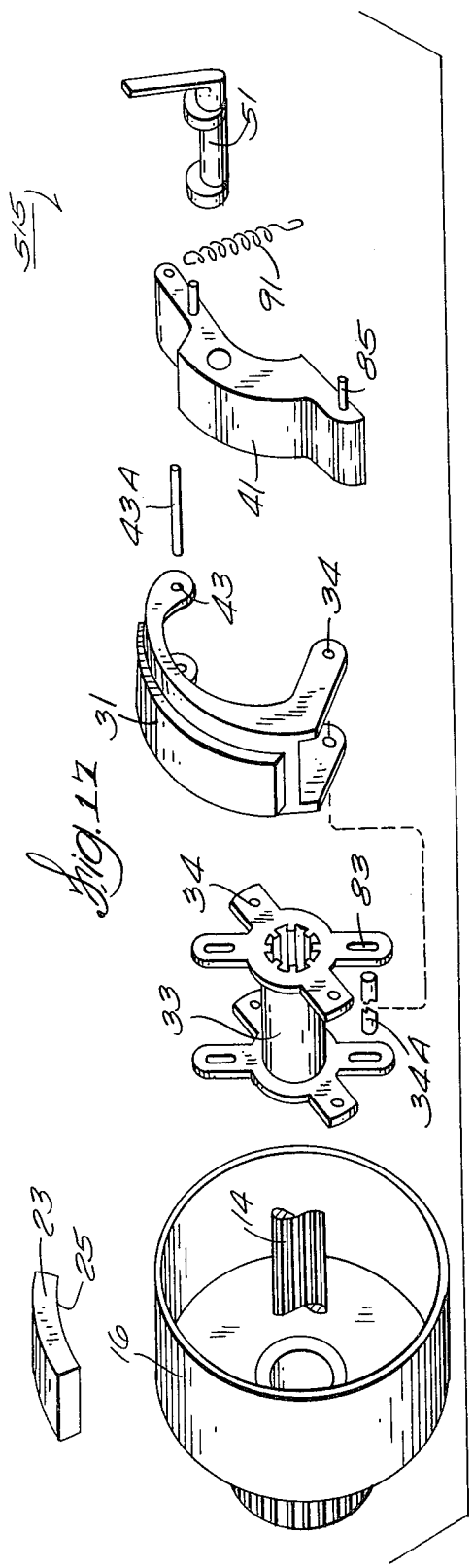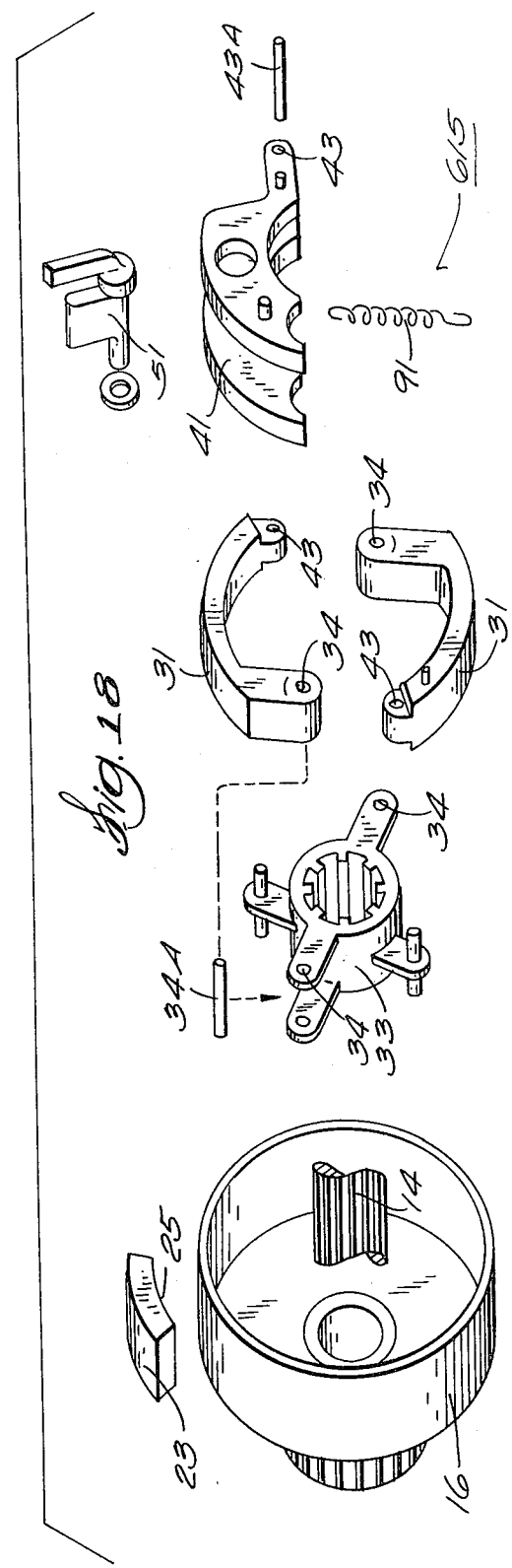

CENTRIFUGAL CLUTCH WITH LATCH CONTROLLED ENGAGING AND RELEASING WEIGHT

BACKGROUND OF THE INVENTION

The invention relates generally to chain saws and centrifugal clutches which are particularly useful in chain saws.

Attention is directed to the following U.S. patents:

| Irgens | 3,144,890 | Issued 8/18/74 |
|---|---|---|
| Deelman | 3,339,596 | Issued 9/05/67 |
| Linkfield | 3,519,037 | Issued 7/07/70 |
| Mattson | 3,664,390 | Issued 5/23/72 |
| Johansson | 3,785,465 | Issued 1/15/74 |

Attention is also directed to Swedish application No. 73-004,251 which was laid open to public inspection about July 12, 1974, in Sweden.

SUMMARY OF THE INVENTION

The invention provides a centrifugal clutch comprising a rotatable driver, a clutch drum carried for coaxial rotation relative to the driver, a clutch shoe carried by the driver for common rotation therewith and for movement between a position engaging the clutch drum so as to effect common rotary movement of the driver and the clutch drum and a second position spaced from the clutch drum, a loading shoe, means connecting the clutch shoe and the loading shoe for relative movement therebetween, a trigger movably mounted on one of the loading shoe and the clutch shoe for movement between a first position engaged between the clutch shoe and the loading shoe so as to transmit centrifugal force from the loading shoe to the clutch shoe and a second position of non-engagement between the clutch shoe and the loading shoe, and means on the loading shoe and on the driver operable when the trigger is in the second position for pivoting the loading shoe in response to radially outward movement thereof so as to positively displace the clutch shoe from the position engaging the clutch drum.

In accordance with an embodiment of the invention, the means on the loading shoe and on the driver operable when the trigger is in the second position for pivoting the loading shoe in response to radially outward movement thereof so as to positively displace the clutch shoe from the position engaging the clutch drum comprises a part fixed to the driver and a surface on the loading shoe engagable, in response to radially outward movement of the loading shoe, with the part so as to form a fulcrum about which the loading shoe pivots in response to further radially outward movement thereof. Preferably, the means connecting the clutch shoe and the loading shoe comprises a pivotal connection which is located to one side of the surface engagable with the part and the loading shoe has a center of gravity located on the side of the surface engagable with the part remote from the pivotal connection between the loading shoe and the clutch shoe. In one embodiment, the surface forms a part of a hook portion extending from the loading shoe radially inwardly of the part. Also in one embodiment, the clutch shoe is carried by the driver for pivotal movement relative thereto about an axis fixed with respect to the driver.

Also in one embodiment in accordance with the invention, there is additionally provided means biasing said loading shoe radially inwardly.

Also in one embodiment in accordance with the invention, the trigger extends, when in the first position, outwardly beyond the drum.

In accordance with one embodiment of the invention, there is further provided a trigger displacing element movable between a position adjacent to the drum so as to displace the trigger from the first position in response to driver rotation and a second position spaced outwardly from the first position and clear of the trigger. Preferably, the element also includes means engagable with the drum for braking drum rotation.

In accordance with an embodiment of the invention, the driver rotates in one direction, the trigger is pivotally mounted on the loading shoe and there is also included means biasing the trigger in the one direction relative to the loading shoe, and a stop on the loading shoe limiting movement of the trigger in the one direction to establish the first trigger position.

In accordance with an embodiment of the invention, there is also included a second clutch shoe, a second loading shoe, and a second trigger arranged and connected to the driver and to one another in the same manner as the first mentioned clutch shoe, loading shoe, and trigger shoe. Preferably there is also provided spring means interconnecting the loading shoes for biasing the loading shoes radially inwardly. In addition, the second clutch shoe, the second loading shoe, and the second trigger are located, with respect to the rotational axis of the driver, in generally diametrically opposite relation to the first mentioned clutch shoe, loading shoe, and trigger.

In an embodiment of the invention, first spring means is employed to interconnect one of the loading shoes and one of the clutch shoes for biasing the one loading shoe and the clutch shoe radially inwardly, and second spring means is employed to interconnect the other of the clutch shoes and the other of the loading shoes for biasing the other clutch and loading shoes radially inwardly.

In accordance with an embodiment of the invention, the clutch shoe includes a radially inwardly facing surface and the trigger includes a shoulder having a surface facing radially outwardly and engaging the inwardly facing surface of the clutch shoe when the trigger is in the first position.

In accordance with an embodiment of the invention, there is also provided means on the loading shoe and on the driver limiting radially inward movement of the loading shoe.

In accordance with an embodiment of the invention, the trigger is mounted on the loading shoe, the means connecting the loading shoe and the clutch shoe is located adjacent to one end of the loading shoe, and the loading shoe has a center of gravity located more remotely from the one end thereof than the mounting of the trigger on the loading shoe.

In accordance with an embodiment of the invention, the clutch shoe includes two arcuately spaced ends and is pivotally mounted to the driver adjacent to one of the ends, the trigger is pivotally mounted on the clutch shoe adjacent to the other of the ends, and the means connecting the clutch shoe and the loading shoe is located intermediate the trigger mounting and the driver mounting.

In accordance with an embodiment of the invention, the trigger includes a tang extending radially inwardly of the mounting thereof on the clutch shoe when the trigger is in the first position, and there is also provided means on the loading shoe engaging the tang to transmit centrifugal force from the loading shoe to the trigger when the trigger is in the first position.

In accordance with an embodiment of the invention, the loading shoe has a center of gravity located more remotely from the means connecting the clutch shoe and the loading shoe than the means on the loading shoe and the driver for pivoting the loading shoe so as to displace the clutch shoe from the position engaging the clutch drum. Preferably, the loading shoe has a greater weight than the clutch shoe.

One of the principal features of the invention is the provision of a centrifugal clutch including positive discontinuance of driving engagement of the centrifugal clutch in response to movement of a clutch trigger from a clutch engaging position.

Another of the principal features of the invention is the provision of centrifugal clutch including a driver, an auxiliary shoe driven by the driver for common rotation therewith and for radially inward and outward movement in response to the rate of driver rotation, and interengaging means on the driver and on the auxiliary shoe for pivoting the auxiliary shoe in response to radially outward auxiliary shoe movement.

Another of the principal features of the invention is the provision of a centrifugal clutch as referred to in the preceding paragraph, together with connection of the auxiliary shoe to a clutch engaging shoe so that the pivotal movement of the auxiliary shoe occurring in response to radially outward movement serves to positively displace the clutch engaging shoe from a position of engagement with a clutch drum.

Other features and advantages of the invention will become known by reference to the following drawings, general description and claims.

THE DRAWINGS

FIG. 1 is a perspective view of a chain saw embodying various of the features of the invention.

FIG. 2 is an enlarged view, partially borken away, showing a centrifugal clutch embodied in the chain saw shown in FIG. 1 and with the clutch shown in the normal driving position.

FIG. 3 is a view similar to FIG. 2 showing the clutch in the disengaged position with the driver rotating above idle speed.

FIG. 4 is a view similar to FIG. 3 showing the clutch in the disengaged position cocked for re-engagement, with the driver rotating at idle speed or below.

FIGS. 5, 6, and 7 are views similar to FIGS. 2, 3, and 4 showing another embodiment of a centrifugal clutch incorporating various of the features of the invention.

FIGS. 8, 9, and 10 are views similar to FIGS. 2, 3, and 4 showing another embodiment of a centrifugal clutch incorporating various of the features of the invention.

FIGS. 11, 12, and 13 are views similar to views 2, 3, and 4 showing still another embodiment of a centrifugal clutch incorporating various of the features of the invention.

FIGS. 14, 15, and 16 are views similar to FIGS. 2, 3, and 4 illustrating still another centrifugal clutch which incorporates various of the features of the invention.

FIG. 17 is an exploded schematic view illustrating still another centrifugal clutch embodying various of the features of the invention.

FIG. 18 is an exploded schematic view of still another centrifugal clutch incorporating various of the features of the invention.

Before explaining the embodiments of the invention in detail, it is to be understood that the invention is not limited in its application to the details of construction and the arrangements of the components set forth in the following description or illustrated in the drawing. The invention is capable of other embodiments and of being practiced and carried out in various ways. Also, it is to be understood that the phraseology and terminology employed herein is for the purposes of description and should not be regarded as limiting.

GENERAL DESCRIPTION

Shown in FIG. 1 is a chain saw 11 including a frame 13 supporting an internal combustion engine (not shown) having an output shaft 14 on which there is mounted a centrifugal clutch 15 which includes a clutch drum 16 and which embodies various of the features of the invention. If desired, the centrifugal clutch 15 can be mounted on another shaft driven by the output shaft. Preferably, the centrifugal clutch 15 forms part of a sprocket assembly (not shown) driving a cutter chain 17 around a cutter bar 19 supported from the frame 13.

Extending from the frame 13 are one or more chain saw handles including a transversely extending handle portion 21. Also included in the chain saw 11 is a clutch control member 23 which is mounted from the frame 13 for movement between a first or normal chain saw operating position extending adjacent to the transverse handle portion 21 and a second position spaced from the normal chain saw operating position and operative to discontinue chain drive and to brake clutch drum rotation. Preferably, the clutch control member 23 is biased by a suitable spring toward the second position and can include a brake element or surface 25 adapted to engage the outer surface of the clutch drum 16.

The centrifugal clutch 15 embodied in the saw chain 11 shown in FIG. 1 is illustrated in detail in FIGS. 2, 3, and 4 and comprises a driver which, as already noted, can be the engine output shaft 14 or other shaft, the clutch drum 16 which is carried by the driver 14 for co-axial relative rotation therebetween and which includes a cylindrical outer surface portion 27 adapted to be engaged by the brake element 25 of the clutch control member 23, together with means for releasably connecting the driver 14 to the clutch drum 16 for common rotation, and means cooperating with the control member 23 for controlling operation of the releasable connection between the driver 14 and the clutch drum 16.

More specifically, and as shown in FIGS. 2, 3, and 4 the centrifugal clutch 15 further includes one or more clutch shoes 31 (two diametrically opposed and generally identical clutch shoes in the illustrated construction) which are carried by the driver 14 for common rotation with the driver, which are movable between a radially outer position engaging the inner surface of the clutch drum to effect common movement of the driver 14 and the clutch drum 16 and a radially inner position out of driving engagement with the clutch drum 16. The clutch shoes 31 extend arcuately and are preferably connected to the driver 14 by a drive element 33 which includes one or more deflection arms 35 (two in the illustrated construction) which respectively carry the clutch shoes 31 and which lightly bias the clutch shoes 31 toward the inner position, but which are sufficiently flexible to permit clutch shoe movement between the inner and outer positions.

The clutch shoes 31 are relatively light in weight and accordingly, by themselves, provide limited frictional force causing common rotation of the clutch drum 16 with the driver 14.

In a preferred form of the invention, the clutch shoes 31, the drive element 33 and the deflection arms are, as illustrated in FIGS. 2 through 4, all parts of a unitary member or element.

In order to increase the frictional force for causing common rotation of the clutch drum 16 with the driver 14, there is also provided, for each of the clutch shoes 31, an auxiliary or loading shoe 41 which is of greater weight than the clutch shoe 31. In part, the loading shoe 41 is located axially adjacent to the associated clutch shoe 31 to facilitate connection therebetween and partially overlapping relative movement.

Means are also provided for connecting the clutch shoes 31 with the loading shoes 41 for relative movement therebetween. While other arrangements are possible, in the illustrated construction, such connecting means comprises pivotal connections 43 located adjacent to the ends of the clutch shoes 31 remote from the connection of the clutch shoes 41 to the driver 14.

The means cooperating with the control member 23 for controlling releasable connection between the driver 14 and the clutch drum 16 also includes, for each clutch shoe 31 and associated loading shoe 41, a trigger 51 which is mounted on one of the clutch shoe 31 and associated loading shoe 41 for movement between a first position engaged between the associated clutch shoe 31 and the loading shoe 41 so as to transmit centrifugal force from the loading shoe 41 to the clutch shoe 31 and thereby increase the frictional force causing common rotation of the clutch drum 16 and the driver 14. The trigger 51 is also movable to a second position of non-engagement between the associated clutch shoe 31 and loading shoe 41.

Further in this regard, the trigger 51 includes an outer end or portion 55 which extends, when the trigger is in the first position, outwardly beyond the clutch drum 16 for engagement with the clutch control member 23 when in its second position. When the trigger 51 is in its position of non-engagement, the trigger outer end 55 is located interiorly of the outer surface of the clutch drum 16. While in the illustrated construction, one trigger 51 is associated with each pair of connected clutch and loading shoes, 31 and 41, if desired, a single trigger could be employed for multiple pairs of connected clutch and loading shoes.

In the specific and preferred construction illustrated in FIGS. 2 through 4, each trigger 51 is pivotally mounted at 52 on the associated loading shoe 41 and is biased for rotation relative to the loading shoe 41 in the same rotational direction as the rotational direction of the driver rotation as illustrated by the arrow 57. More specifically, the trigger 51 is biased for clockwise rotation toward the first trigger position by means in the form of a spring 59 which includes a central coil portion 61 encircling a stud 63 on the loading shoe 41, which, at one end, bears against a stop 65 on the trigger 51 and which, at the other end, bears against a part or stop 67 on the loading shoe 41.

Suitable means are provided for limiting rotation of the trigger 51 in the clockwise direction so as to establish the first trigger position. In the construction illustrated in FIGS. 2 through 4, such means comprises (See FIG. 2) a stop 69 on the loading shoe 41 engagable by an edge 71 on the trigger 51.

Means are provided for engaging the trigger 51 with the clutch shoe 31 when the trigger 51 is in the first position for transmitting centrifugal force from the loading shoe 41 to the clutch shoe 31. While other constructions could be employed, in the construction illustrated in FIGS. 2 through 4, such means comprises a shoulder 73 on the trigger 51 engagable with an inner edge or surface 75 on the clutch shoe 31. In the illustrated construction, the loading shoe 41 is designed so that the center of gravity thereof is adjacent to the pivotal mounting of the trigger 51.

Also provided are means on the driver and on the loading shoe operable when the trigger 51 is in the second position for pivoting the loading shoe 41 in response to radially outward movement thereof so as to posivitively displace the clutch shoe 31 from the position engaging the clutch drum 16.

More specifically, in the construction illustrated in FIGS. 2 through 4, the loading shoes 41 each include a hook position 81 having an edge or surface 83 engagable with a part or stop 85 having common rotation with a driver 14. Still more specifically, the stop 85 extends fixedly from the drive element 33. Thus, in operation, when the trigger 55 is in the second position shown in FIG. 3, rotation of the driver 14 causes common rotation of the loading shoe 41 which, in turn, causes radially outward swinging of the loading shoe 41 about the pivotal connection 43 of the loading shoe 41 to the clutch shoe 31. Such movement initially causes engagement of the edge 83 with the stop 85, which engagement thereafter acts, upon continued rotation of the driver 14, as a fulcrum or pivot about which the loading shoe 41 pivots so as to positively radially retract the pivotal connection 43 with the clutch shoe 31 and thereby displace the clutch shoe 31 to its position of non-engagement with the clutch drum 16.

In the construction illustrated in FIGS. 2 through 4, the edge 83 is located less remotely from the pivotal connection 43 with the clutch shoe 31 than the trigger 15 or the loading shoe center of gravity.

Preferably, the center of gravity of the loading shoe 41 is located so as to maximize the force transmitted through the trigger 51 to the clutch shoe 31, while minimizing the weight of the loading shoe 41. In this last regard, the center of gravity of the loading shoe generates, in response to rotation, a moment which is balanced by a moment produced in response to the reaction of the trigger 51 to the loading shoe 41. Accordingly, the force transmitted to the clutch shoe 31 from the loading shoe 41 through the trigger 51 can be maximized with minimum loading shoe mass or weight by relatively increasing the moment arm to the center of gravity while relatively decreasing the moment arm to the line of force transmission between the loading shoe 41 and the trigger 51. Preferably, the center of gravity is also located so as, when the trigger 51 is in the second position, to insure positive displacement of the clutch shoe 31 from engagement with the clutch drum 16 without requiring an increase in the loading shoe mass or weight utilized in generating the force transmitted through the trigger 51 to the clutch shoe 31 when the trigger is in the first position.

Means are also provided for biasing the loading shoes 41 radially inwardly. While other arrangements are possible, in the construction illustrated in FIGS. 2 through 4, such means comprises a pair of helical springs 91 attached at their ends to posts 67 and 92 on the oppositely located loading shoes 41 and with the springs extending on opposite sides of the axis of driver rotation. Thus, when the driver 14 is rotating at idle speed or below, the loading shoes 41 are bodily moved radially inwardly (as shown in FIG. 4) in such manner to displace the clutch shoes 31 away from their positions of engagement with the clutch drum.

Means are also provided on the driver 14 and on the loading shoes 41 for limiting radially inward loading shoe movement. While other constructions could be employed, in the construction illustrated in FIGS. 2 through 4, such means comprises (See FIG. 4) respective abutting edges 93 and 95 on the drive element 33 and on the loading shoes 41, together with engagement of the edge portions 97 of the loading shoes 41 with the opposite side of the stops 85 which additionally serve, as already pointed out, as a fulcrum operable to pivot the associated loading shoes 41 so as to thereby positively displace the connected clutch shoes 31 from engagement with the clutch drum 16.

Operation of the centrifugal clutch 15 shown in FIGS. 2 through 4 is as follows: When the control member 23 is in the first position and the driver 14 is rotating, the various clutch components are in the position shown in FIG. 2 wherein the clutch drum 16 is driven by the driver 14. When it is desired to stop movement of the cutter chain, the control member 23 is moved to its second position adjacent to the clutch drum 16, as shown in FIG. 3. Such movement causes engagement of the control member 23 with the triggers 51 in such manner as to displace the triggers 51 away from their first positions and to their positions of non-engagement located interiorly of the outer surface of the clutch drum 16. Such trigger movement dis-engages the shoulders 73 from the inner edge or surface 75 of the associated clutch shoe 31 and permits radially outward swinging movement of the loading shoes 41 about their pivotal connections 43 with the clutch shoes 31 so as to enable engagement of the hook portion edges 83 with the driver stops 85. Thereafter, continued radially outward movement of the center of gravity of the loading shoes 41 causes pivotal movement of the loading shoes 41 about the stops 85, thus positively radially inwardly displacing the pivot connections 43 between the clutch shoes 31 and the loading shoes 41 so as to disengage the clutch shoes 31 from the clutch drum 16 as illustrated in FIG. 3. Assuming the control member 23 to include a brake element 25 engaged with the drum outer cylindrical curface when the control member 23 is in its second position, disengagement of the clutch shoes 31 from the clutch driver 14 permits rapid discontinuance of clutch drum rotation, notwithstanding continued driver rotation.

When the components are in the position shown in FIG. 3, the trigger 51 cannot be returned to its first position because of the partially overlying relation of the clutch shoes 31 and the loading shoes 41 and because the inner edge 75 of the clutch shoe 31 is insufficiently spaced from the trigger mounting to permit re-engagement of the trigger 51 with the clutch shoe 31.

Thus, in order to obtain such re-engagement of the triggers 51 with the clutch shoes 31, i.e., to return the triggers 51 to the first positions, the driver 14 must return to idle speed or below in order to permit sufficient inward displacement of the loading shoes 41 by the springs 91, as shown in FIG. 4, to permit the trigger biasing springs 59, to locate the triggers 51 in position for engagement with the clutch shoes 31 consequent to a subsequent increase in driver rotation speed. Upon such an increase in driver rotation, the clutch shoes will move radially outwardly to lightly engage the clutch shoes with the clutch drum as shown in FIG. 4, and the loadings shoes 41 will move radially outwardly to insure engagement of the shoulders 73 with the inner surfaces 75 of the clutch shoes 31. Accordingly, the disclosed clutch 15 can only be initially engaged when the driver is rotating at idle speed or below.

If desired, the springs 91 biasing the loading shoes 41 inwardly can be omitted while still obtaining radially inward movement of the loading shoes 41 after movement of the trigger to the second position and in response to a decrease in the rate of rotation. In this regard, the trigger biasing spring 59 can be designed so as to bias the trigger 51 in the direction toward the first position with such force so that, in conjunction with the shoulder 73 and the edge or surface 75, the clutch shoe 31 and the loading shoe 41 are forced apart incident to return trigger movement toward the first position from the second position when the clutch is rotating at idle speed or below. Such return movement of the trigger 51, under the influence of the trigger biasing spring 59, would also serve to radially separate the clutch shoe 31 and the loading shoe 41 and thereby displace the loading shoe 41 radially inwardly upon sufficient reduction in the rate of rotation.

Shown in FIGS. 5 through 7 is another embodiment of a centrifugal clutch 115 which, except as noted below, is generally of similar construction to the clutch 15 shown in FIGS. 2 through 4. Accordingly, the same reference numerals have been applied in the drawings to the components of the clutch 115 as have been previously applied to the comparable components of the clutch 15.

The centrifugal clutch 115 shown in FIGS. 5 through 7 differs principally from the clutch 15 illustrated in FIGS. 2 through 4 in that the clutch shoes 31 are respectively formed as parts of separate clutch shoe members 32 which are idividually pivotally mounted at 34 to the opposite ends of a diametrically extending drive element 33.

In addition, in the clutch 115 shown in FIGS. 5 through 7, the trigger biasing spring has been omitted and reliance is placed on centrifugal force to relocate the trigger 51 in the first position.

Still further, the means limiting radially inward movement of the loading shoes 41 includes interengaging surfaces located respectively on the drive element 33 and on the loading shoes 41 as compared to engagement of the stops 85 with the loading shoe surfaces 97.

The operation of the centrifugal clutch 115 shown in FIGS. 5 through 7 is essentially the same as the centrifugal clutch 15 shown in FIGS. 2 through 4 and accordingly, no further description is believed to be necessary.

Shown in FIGS. 8 through 10 is still another embodiment of a centrifugal clutch 215 which primarily differs from the clutch 115 shown in FIGS. 5 through 7 by reason of employment of three sets of clutch shoes 31, loading shoes 41, and triggers 51, and by reason of variation in the arrangement for biasing the loading shoes 41 radially inwardly. Thus, the same reference numerals have been applied to the components of the clutch 215 as have been employed with respect to the comparable components of the clutch 115.

In the clutch 215, the three sets of clutch shoes 31, loading shoes 41, and triggers 51 are equally spaced around the driver 14 and the biasing means comprises three helical springs 91 which are anchored at their ends to posts 92 extending from the loading shoes 41 and which generally form an equiangular triangle.

As the operation of the clutch 215 shown in FIGS. 8 through 10 is essentially the same as that of the clutch 115 shown in FIGS. 5 through 7, no further description is believed to be necessary.

Shown in FIGS. 11 through 13 is another centrifugal clutch 315 which, in addition to a driver 14 and a clutch drum 16, also includes one or more clutch shoe members 32 each having a clutch shoe 31 (two clutch shoe members 32 are illustrated in FIGS. 11 through 13), a loading shoe 41 associated with each clutch shoe 31, and a trigger 51 rotatably mounted at 52 on each clutch shoe member 32 adjacent the end thereof remote from the pivotal mounting 34 of the clutch shoe member 32 to the drive element 33. As in the other embodiments, the trigger 51 is movable between a first generally radially extending position wherein the outer end or portion 55 thereof is located for engagement with a clutch control member 23 when the clutch control member is in the position adjacent to the outer cylindrical surface of the clutch drum 16 and wherein centrifugal force is transmittable from the loading shoe 41 to the clutch shoe 31, and a second position permitting relative movement between the clutch shoe 31 and the loading shoe 41.

As compared the previous embodiments, in the clutch 315, the loading shoe 41 is connected to the clutch shoe 31 about a pivot 43 intermediate the pivotal mounting 52 of the trigger 51 and the clutch shoe member 32 and the pivotal mounting of the clutch shoe member 32 and the drive element 33.

Included on the trigger 51 and on the loading shoe 41 are means for retaining the loading shoe 41 in centrifugal force transmitting condition relative to the clutch shoe 31. Thus, in the clutch 315, the loading shoe 41 includes a notch 42 which receives a trigger tang 44 extending radially inwardly when the trigger is in the first position.

Still further, in the clutch 315, the means of the drive element 33 and on the loading shoe 41 for engagement so as to inwardly displace the pivotal connection 43 between the clutch shoe 31 and the loading shoe 41 and thereby move the clutch shoe 31 from the drum engaging position comprises a stop 85 on the drive element 33 and a radially outer edge 83 on the loading shoe 31 located between the notch 42 and the pivotal connection 43 of the loading shoe 41 with the clutch shoe member 32.

Also in the clutch 315, the center of gravity of the loading shoe 41 is more remote from the pivotal connection 43 with the clutch shoe member 32 than the stop engaging surface 83 and preferably, is located adjacent to the notch 42.

Also in the clutch 315, the means biasing the loading shoes 41 radially inwardly comprises two similarly arranged helical springs 91 each having one end connected to an anchor or post 92 on one of a pair of diametrically opposed clutch shoes 31 and having one end connected to an anchor or post 92 adjacent the outer end of the opposite one of a pair of oppositely located loading shoes 41.

Operation of the clutch 315 is essentially the same as that previously described and will not be further described except to note that when the components are in the condition shown in FIG. 12, the trigger 51 cannot rotate to the first position because the loading shoe 41 is to closely spaced relative to the clutch shoe 31 to permit entry of the trigger tang 53 into the loading shoe notch 42.

Shown in FIGS. 14 through 16 is still another centrifugal clutch 415 which embodies various of the features of the invention and which, as in the other embodiments, includes a drive element 33 mounted on a driver 14 for common rotation, a clutch drum 16 mounted for co-axial rotation relative to the driver 14, a clutch shoe member 32 mounted on the drive element 33 and including a clutch shoe 31 movable relative to position of engagement with the clutch drum 16, a loading shoe 41 mounted on the clutch shoe member about a pivot 43 and a trigger mounted on the clutch shoe member 32.

In the clutch 415, the loading shoe 41 is pivotally mounted to the clutch shoe member 32 adjacent the end thereof remote from the pivotal mounting 43 of the clutch shoe member 32 on the drive element 33.

In the clutch 415, the trigger 51 is pivotally mounted at 52 on a projection 58 extending from the clutch shoe member 32 in the direction from the pivotal mounting 43 opposite from the direction of the clutch shoe 31. In addition, the trigger 51 and the loading shoe 41 include interengaging parts for transmitting centrifugal force from the loading shoe 41 to the clutch shoe 31 when the trigger 51 is in the first position. In the construction shown in FIGS. 14 through 16, such means comprises a post 42 engaged along a surface 53 (See FIG. 15).

Also in the clutch 415, the loading shoe biasing means comprises two springs 91, each of which is connected, at one end, to a post 92 on one of the clutch shoes 31 and each of which is connected, at its other end, to a post 92 on one of the loading shoes 41 adjacent the outer end thereof.

Operation of the clutch shown in FIGS. 14 through 16 is essentially identical to the clutches shown in the other Figures and accordingly will not be further described.

Shown schematically in FIG. 17 is still another embodiment of a centrifugal clutch 515 which embodies various of the features of the invention and which includes a clutch drum 16, a driver 14 rotatable relative to the clutch drum and connected to a drive element 33, one or more relatively light clutch shoes 31 (two in the construction illustrated in FIG. 17, but only one shown) pivotally mounted from drive element 33 at 34 by a pin 34A, a loading shoe 41 (only one shown) pivotally mounted to each clutch shoe 31 and 43 by a pin 43A, a trigger 51 pivotally mounted on each loading shoe 41 for movement between a position engaging the associted clutch shoe 31 to transmit centrifugal force from the loading shoe 41 to the clutch shoe 31 and a position of non-engagement, and spring means 91 for biasing the loading shoes 41 radially inwardly.

In addition, the loading shoe 41 and the drive element 33 include interengaging parts for providing a fulcrum effecting displacement of the clutch shoes 31 away from the clutch drum 16 when the trigger 51 is in the non-clutch drum engaging position. Still further, in the clutch 515, such means comprises a pin 85 on the loading shoe 41 received in a slot 83 in the drive element 33.

In addition, the pin 85 also serves to engage the drive element 33 to limit radially inward and outward movement of the loading shoe 31 relative to the drive element 32.

Operation of the clutch shown in FIG. 17 is essentially the same as operation of the previously described clutches and accordingly will not be further described.

Shown schematically in FIG. 18 is still another embodiment of a centrifugal clutch 615 which embodies various of the features of the invention and which includes a clutch drum 16, a driver 14 rotatable relative to the clutch drum and connected to a drive element 33, one or more relatively light clutch shoes 31 (two in the construction illustrated in FIG. 18) pivotally mounted from drive element 33 at 34 by a pin 34A, a loading shoe 41 (only one shown) pivotally mounted to each clutch shoe 31 at 43 by a pin 43A, a trigger 51 pivotally mounted on each loading shoe 41 for movement between a position engaging the associted clutch shoe 31 to transmit centrifugal force from the loading shoe 41 to the clutch shoe 31 and a position of non-engagement, and spring means 91 for biasing the loading shoes 41 radially inwardly.

In addition, the loading shoes 41 and the drive element 33 include interengaging parts for providing a fulcrum effecting displacement of the clutch shoes 31 away from the clutch drum 16 when the trigger 51 is in the non-clutch drum engaging position. Still further, in the clutch 515, such means comprises a pin 85 on the loading shoe 41 received in a slot 83 in the drive element 33.

In addition, the pin 85 also serves to engage the drive element 33 to limit radially inward and outward movement of the loading shoe 31 relative to the drive element 32.

Operation of the clutch shown in FIG. 18 is essentially the same as operation of the previously described clutches and accordingly will not be further described.

In addition, all of the clutches described above are characterized by pivotal movement of the loading shoe 41, when the trigger 51 is moved form the projecting position by reason of engagement with the clutch controlling member 23, relative to the clutch shoe 31 and relative to the driver 14 in such manner as to positively effect radially inward movement of the associated clutch shoe 31 out of engagement with the clutch drum 16.

Various of the features of the invention are set forth in the following claims.

I claim:

1. A centrifugal clutch comprising a rotatable driver, a clutch drum carried for co-axial rotation relative to said driver, a clutch shoe carried by said driver for common rotation therewith and for movement between a position engaging said clutch drum so as to effect common rotary movement of said driver and said clutch drum and a second position spaced from said clutch drum, a loading shoe, means connecting said clutch shoe and said loading shoe for relative movement therebetween, a trigger movably mounted on one of said loading shoe and said clutch shoe for movement between a first position engaged between said clutch shoe and said loading shoe so as to transmit centrifugal force from said loading shoe to said clutch shoe and a second position of non-engagement between said clutch shoe and said loading shoe, and means on said loading shoe and on said driver operable when said trigger is in said second position for pivoting said loading shoe in response to radially outward movement thereof so as to positively displace said clutch shoe from said position engaging said clutch drum.

2. A centrifugal clutch in accordance with claim 1 wherein said means on said loading shoe and on said driver operable when said trigger is in said second position for pivoting said loading shoe in response to radially outward movement thereof so as to positively displace said clutch shoe from said position engaging said clutch drum comprises a part fixed to said driver and a surface on said loading shoe engagable, in response to radially outward movement of said loading shoe, with said part so as to form a fulcrum about which said loading shoe pivots in response to further radially outward movement thereof.

3. A centrifugal clutch in accordance with claim 2 wherein said means connecting said clutch shoe and said loading shoe comprises a pivotal connection.

4. A centrifugal clutch in accordance with claim 2 wherein said pivotal connection between said loading shoe and said clutch shoe is located to one side of said surface engagable with said part and wherein said loading shoe has a center of gravity located on the side of said surface engagable with said part remote form said pivotal connection between said loading shoe and said clutch shoe.

5. A centrifugal clutch in accordance with claim 2 wherein said surface forms a part of a hook portion extending from said loading shoe radially inwardly of said part.

6. A centrifugal clutch in accordance with claim 2 wherein said clutch shoe is carried by said driver for pivotal movement relative thereto about an axis fixed with respect to said driver.

7. A centrifugal clutch in accordance with claim 1 wherein said clutch shoe is carried by said driver for pivotal movement relative thereto about an axis fixed with respect to said driver, wherein said means connecting said clutch shoe and said loading shoe comprises a pivotal connection, and wherein said means on said loading shoe and on said driver operable when said trigger is in said second position for pivoting said loading shoe in response to radially outward movement thereof so as to positively displace said clutch shoe from said position engaging said clutch drum comprises a part fixed to said driver and a surface on said loading shoe engagable, in response to radially outward movement of said loading shoe, with said part so as to form a fulcrum about which said loading shoe moves in response to further radially outward movement thereof, and wherein said loading shoe has a center of gravity located more remotely from said pivotal connection between said clutch shoe and said loading shoe than said surface.

8. A centrifugal clutch in accordance with claim 1 wherein said loading shoe has a greater weight than said clutch shoe.

9. A centrifugal clutch in accordance with claim 1 and further including means biasing said loading shoe radially inwardly.

10. A centrifugal clutch in accordance with claim 1 wherein said trigger extends, when in said first position, outwardly beyond said drum.

11. A centrifugal clutch in accordance with claim 10 and further including a trigger displacing element movable between a position adjacent to said drum so as to displace said trigger from said first position in response to driver rotation and a second position spaced outwardly from said first position and clear of said trigger.

12. A centrifugal clutch in accordance with claim 11 wherein said clutch drum includes an outer cylindrical surface portion and wherein said element also includes means engagable with said drum outer cylindrical surface portion for braking drum rotation.

13. A centrifugal clutch in accordance with claim 1 wherein said trigger is mounted on said clutch shoe.

14. A centrifugal clutch in accordance with claim 1 wherein said trigger is mounted on said loading shoe.

15. A centrifugal clutch in accordance with claim 1 wherein said trigger is pivotally mounted on one of said clutch shoe and said loading shoe and wherein said means connecting said clutch shoe and said loading shoe is a pivotal connection.

16. A centrifugal clutch in accordance with claim 1 wherein said driver rotates in one direction, wherein said trigger is pivotally mounted on said loading shoe and further including means biasing said trigger in said one direction relative to said loading shoe, and a stop on said loading shoe limiting movement of said trigger in said one direction to establish said first trigger position.

17. A centrifugal clutch in accordance with claim 1 and further including a second clutch shoe, a second loading shoe, and a second trigger arranged and connected to said driver and to one another in the same manner as said first mentioned clutch shoe, loading shoe, and trigger shoe.

18. A centrifugal clutch in accordance with claim 17 and further including spring means interconnecting said loading shoes for biasing said loading shoes radially inwardly.

19. A centrifugal clutch in accordance with claim 17 and further including first spring means interconnecting one of said loading shoes and one of said clutch shoes for biasing said one loading shoe and said one clutch shoe radially inwardly, and second spring means interconnecting the other of said clutch shoes and the other of said loading shoes for biasing said other clutch and loading shoes radially inwardly.

20. A centrifugal clutch in accordance with claim 17 wherein said second clutch shoe, said second loading shoe, and said second trigger are located, with respect to the rotational axis of said driver, in generally diametrically opposite relation to said first mentioned clutch shoe, loading shoe, and trigger.

21. A centrifugal clutch in accordance with claim 17 and further including a third clutch shoe, a third loading shoe, and a third trigger arranged and connected to said driver and to one another in the same manner as said first mentioned clutch shoe, loading shoe, and trigger, and wherein said first mentioned clutch shoe, loading shoe, and trigger and said second clutch shoe, loading shoe, and trigger and said third clutch shoe, loading shoe, and trigger are angularly equidistantly spaced apart.

22. A centrifugal clutch in accordance with claim 21 and further including spring means interconnecting said loading shoes for biasing said loading shoes inwardly.

23. A centrifugal clutch in accordance with claim 1 wherein said clutch shoe includes a radially inwardly facing surface and said trigger includes a shoulder having a surface facing radially outwardly and engaging said inwardly facing surface of said clutch shoe when said trigger is in said first position.

24. A centrifugal clutch in accordance with claim 1 wherein said clutch shoe extends arcuately and is connected, at one end, to said driver and is connected, at the other end, to said loading shoe.

25. A centrifugal clutch in accordance with claim 24 wherein said one end of said clutch shoe is pivotally connected to said driver.

26. A centrifugal clutch in accordance with claim 1 and further including means on said loading shoe and on said driver limiting radially inward movement of said loading shoe.

27. A centrifugal clutch in accordance with claim 1 wherein said trigger is mounted on said loading shoe, wherein said means connecting said loading shoe and said clutch shoe is located adjjacent to one end of said loading shoe, and wherein said loading shoe has a center of gravity located more remotely from said one end thereof than the mounting of said trigger on said loading shoe.

28. A centrifugal clutch in accordance with claim 1 wherein said clutch shoe includes two arcuately spaced ends, wherein said clutch shoe is pivotally mounted to said driver adjacent to one of said ends, wherein said trigger is pivotally mounted on said clutch shoe adjacent to the other of said ends, and wherein said means connecting said clutch shoe and said loading shoe is located intermediate said trigger mounting and said driver mounting.

29. A centrifugal clutch in accordance with claim 28 wherein said trigger includes a tang extending radially inwardly of the mounting thereof to said clutch shoe when said trigger is in said first position, and means on said loading shoe engaging said tang to transmit centrifugal force from said loading shoe to said trigger when said trigger is in said first position.

30. A centrifugal clutch in adcordance with claim 1 wherein said loading shoe has a center of gravity located more remotely from said means connecting said clutch shoe and said loading shoe than said means on said loading shoe and said driver for pivoting said loading shoe so as to displace said clutch shoe from said position engaging said clutch drum.

31. A centrifugal clutch in accordance with claim 1 wherein said clutch shoe forms a part of an integral member directly mounted on said driver for common rotation with said driver.

32. A centrifugal clutch in accordance with claim 1 and further including a spring biasing said trigger toward said first position so as to also bias said loading shoe radially inwardly away from said clutch shoe.

* * * * *